US006824146B2

(12) United States Patent
Kang

(10) Patent No.: US 6,824,146 B2
(45) Date of Patent: Nov. 30, 2004

(54) AIR SUSPENSION SYSTEM OF A VEHICLE

(75) Inventor: Seok-Hwa Kang, Seoul (KR)

(73) Assignee: Hyundai Motor Company, Seoul (KR)

( * ) Notice: Subject to any disclaimer, the term of this patent is extended or adjusted under 35 U.S.C. 154(b) by 61 days.

(21) Appl. No.: 10/266,868

(22) Filed: Oct. 8, 2002

(65) Prior Publication Data

US 2003/0067124 A1 Apr. 10, 2003

(30) Foreign Application Priority Data

Oct. 8, 2001 (KR) .......................................... 2001-61795

(51) Int. Cl.[7] .......................... B60G 11/27; B60G 17/00
(52) U.S. Cl. .............................. 280/6.159; 280/124.16; 267/64.19
(58) Field of Search ................. 280/6.159, 6.157, 280/124.16; 267/64.16, 64.19, 64.21, 64.17

(56) References Cited

U.S. PATENT DOCUMENTS

| 2,361,575 | A | * | 10/1944 | Thompson | ............... | 267/64.19 |
| 2,973,954 | A | * | 3/1961 | Eater | ....................... | 267/64.19 |
| 3,074,709 | A | * | 1/1963 | Ballard et al. | ........... | 280/6.157 |
| 3,552,767 | A | * | 1/1971 | Yew et al. | ............... | 280/6.159 |
| 4,231,554 | A | * | 11/1980 | Ekonen et al. | ........... | 280/6.159 |
| 4,274,643 | A | * | 6/1981 | Hendrickson | ............ | 280/6.159 |
| 4,676,523 | A | | 6/1987 | Rogers | | |
| 4,735,401 | A | | 4/1988 | Buma et al. | | |
| 5,058,017 | A | | 10/1991 | Adachi et al. | | |
| 5,871,217 | A | | 2/1999 | Blanz | | |
| 6,203,026 | B1 | | 3/2001 | Jones | | |
| 6,402,128 | B1 | * | 6/2002 | Trowbridge | .............. | 267/64.21 |

FOREIGN PATENT DOCUMENTS

| EP | 0 284736 B1 | 8/1990 |
| EP | 0 398 009 B1 | 6/1993 |
| EP | 0 561 394 B1 | 2/1996 |
| EP | 0 742 113 B1 | 10/2001 |
| WO | WO 01/53136 A1 | 7/2001 |

* cited by examiner

Primary Examiner—Peter C. English
(74) Attorney, Agent, or Firm—Morgan Lewis & Bockius LLP

(57) ABSTRACT

An air suspension system for a vehicle wherein a valve means for varying the resilience of an air spring in response to changes of vehicle height is integrally formed with an air spring to be mounted on the vehicle frame such that the installation space of the air suspension system can be minimized. As a result, cumbersome processes involved with the manufacture of the vehicle can be eliminated to provide an improved convenience for workers. A conventional lever used for connecting a leveling valve and an air spring is dispensed with to reduce the number of parts constituting the air suspension system and lower the manufacturing cost.

3 Claims, 5 Drawing Sheets

AIR SUSPENSION SYSTEM OF A VEHICLE

FIELD OF THE INVENTION

The present invention relates to an air suspension system for a vehicle, and more particularly, to an air suspension system with an integrated leveling valve and an air spring, reducing the size of the mounting space and cutting manufacturing cost

BACKGROUND OF THE INVENTION

Generally, an air suspension system mounted on commercial vehicles such as large buses and heavy-duty trucks consists of an air tank, a leveling valve, an air spring and the like. The system utilizes air resilience to absorb small vibrations, thereby improving ride comfort and enabling the vehicle height to be adjusted at a predetermined level by way of pressure control.

A typical air suspension system includes a leveling valve mounted on the vehicle frame adjacent an air spring also mounted to support a bottom area of the vehicle frame. The leveling valve and the air spring are interconnected by a pivoting lever. The leveling valve also typically includes a first port for receiving compressed air from an air tank, a second port for receiving air discharged from the air spring and a third port selectively connected to the second port to discharge the air received from the air spring. Such valves operate as is well known in the art.

However, there are problems with such prior art air suspension systems in that the leveling valve and the air spring are separately mounted to the vehicle frame and thus require a large mounting space, thereby causing a cumbersome process in manufacturing and providing inconvenience to workers as well. There is another problem in that a minimum length of the lever connecting the leveling valve and the air spring is required, resulting in an increase of the number of parts constituting the air suspension system and a rise in manufacturing cost.

SUMMARY OF THE INVENTION

In an embodiment of the present invention, an air suspension system for a vehicle includes an air spring valve means mounted on the vehicle frame for varying resilience of an air spring in response to changes of vehicle height. Such an arrangement minimizes the installation space of the air suspension system, decreasing cumbersome processes involved in the manufacturing of a vehicle and providing an improved convenience to workers. The present invention also eliminates the lever used for connecting the leveling valve to the air spring, thereby reducing the number of parts constituting the air suspension system and eventually also lowering the manufacturing cost.

In accordance with an embodiment of the present invention, an air suspension system for vehicle comprises an air spring connected at an upper end thereof to a lower part of a vehicle frame for supporting the vehicle body. An upper member penetrates the air spring from the top and is coupled to the frame. A lower member penetrates the air spring from the bottom and is coupled to a lower end of the air spring and to the vehicle axle. A linear sliding movement of both the upper and lower members gives rise to changes in the overall length thereof. A valve means supplies compressed air from an air tank into the air spring in response to the linear sliding movement of the upper and lower members, or discharges the air inside the air spring out into the atmosphere.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Hereinafter, the embodiments of the present invention will be described in detail with reference to the accompanying drawings.

Figure 1:
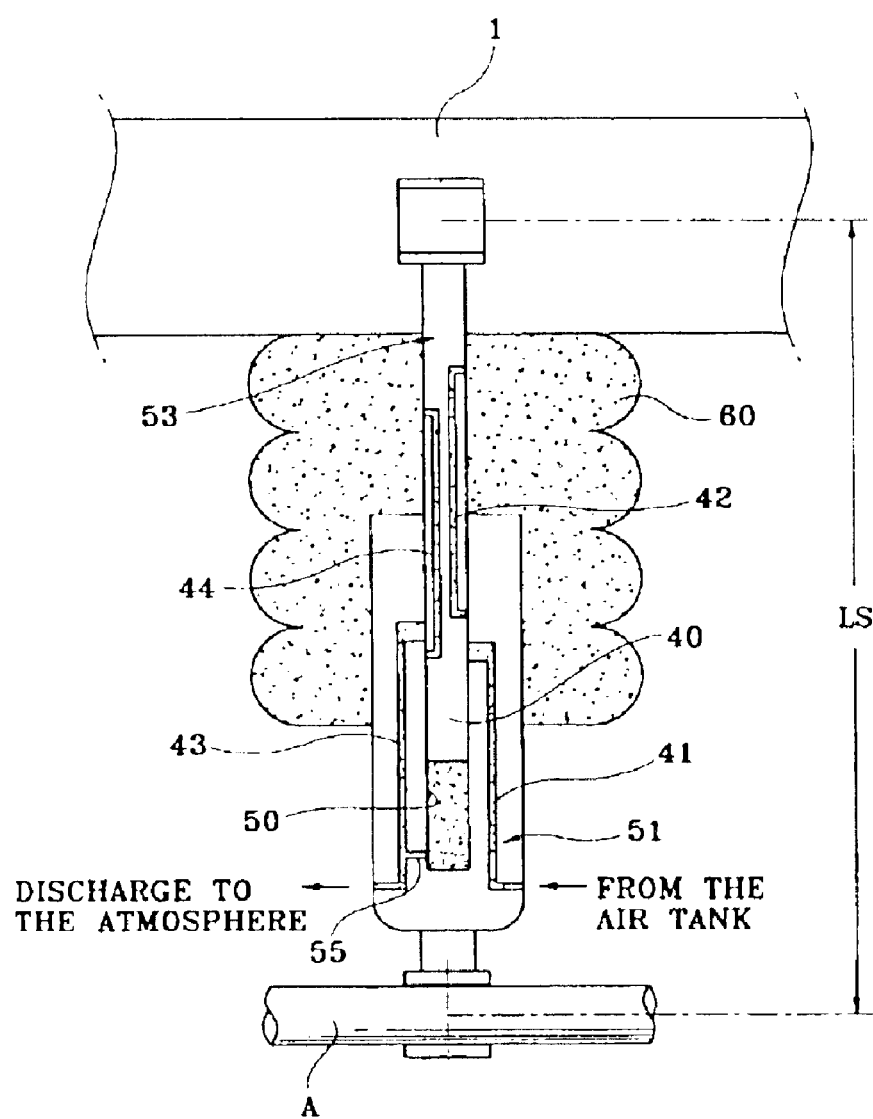
FIGS. 1, 2 and 3 are longitudinal sectional views illustrating an air suspension system and its operational principle according to the present invention.
Figure 2:
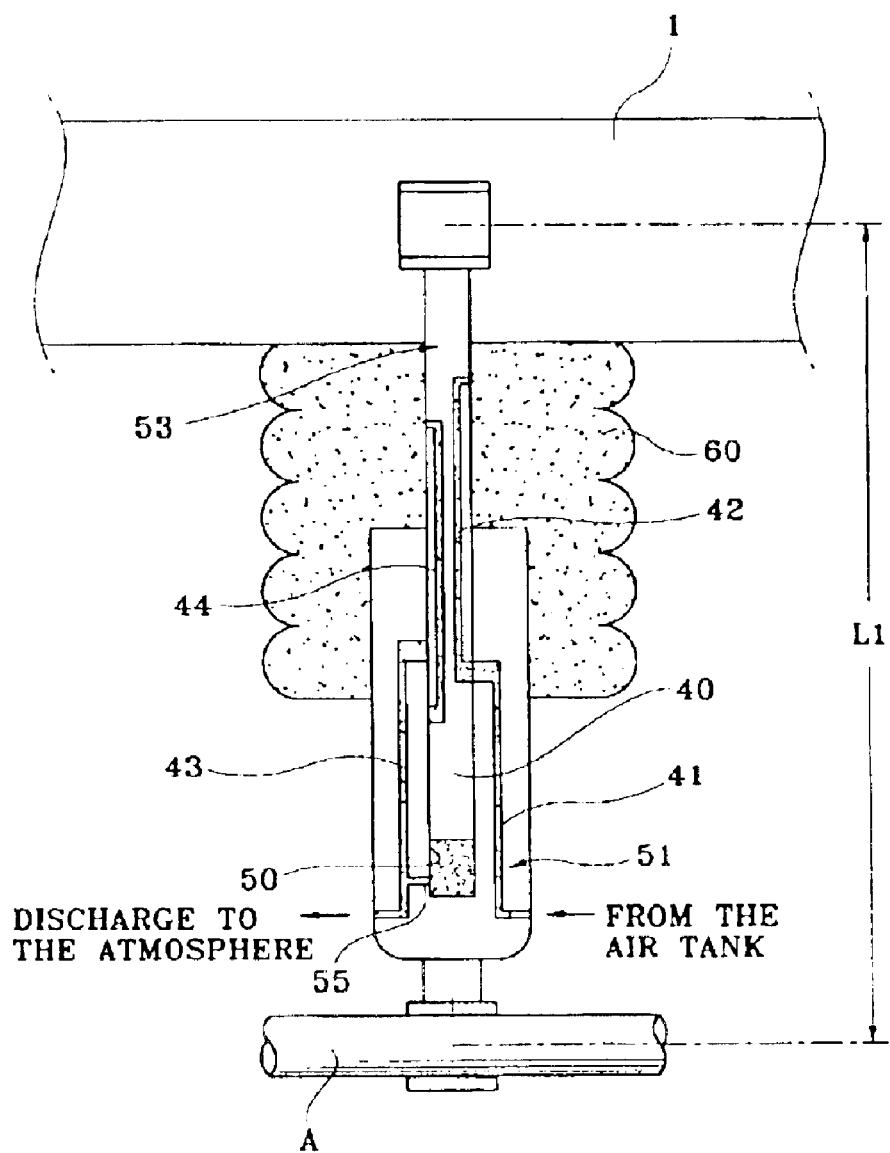
Figure 3:
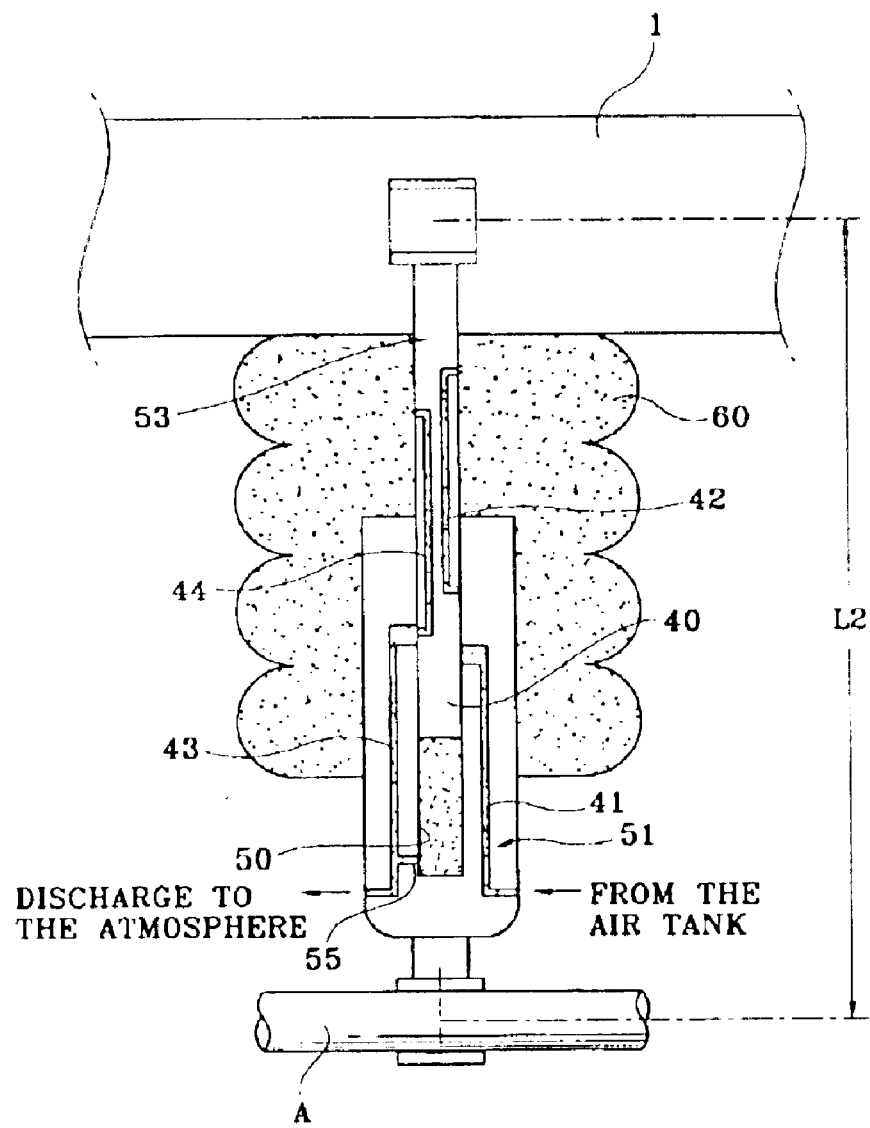

As shown in FIGS. 1, 2 and 3, a valve means for controlling the internal pressure of air spring 60 is preferably integrally formed inside a space occupied by the air spring 60. The air suspension system according to the present invention includes an air spring 60 connected at an upper end thereof to a lower part of a vehicle frame 1 for directly supporting the vehicle body. An upper member penetrates the air spring 60 from the top and is coupled to the vehicle frame 1. A lower member penetrates the air spring 60 from the bottom and is coupled to a lower end of the air spring 60 and to a vehicle axle A. Linear sliding movement of both the upper and lower members gives rise to changes in the overall length thereof. A valve means supplies compressed air from an air tank (not shown) to the air spring 60 in response to the linear sliding movement of the two members or discharges the air inside the air spring 60 out into the atmosphere.

The lower member preferably comprises a cylinder member 51 formed with a cylinder hole 50 having a predetermined sectional shape along a lengthwise direction while the upper member comprises a piston member 53 having a piston part 40 formed lengthwise in a cross-sectional shape corresponding to that of the cylinder hole 50. The piston part 40 of piston member 53 vertically slides a preset distance while inserted into the cylinder hole 50 of cylinder member 51. An upper end of the piston member 53 is fixed to the vehicle frame while the cylinder member 51 is connected to vehicle axle A at a lower end thereof and is integrally connected to a lower end of the air spring 60.

The valve means includes a first air passage 41 formed in the cylinder member 51, one end of which is connected to the air tank for receiving the compressed air and the other end of which is connected to the cylinder hole 50. A second air passage 42 is formed in the piston member 53, one end of which is formed to communicate with an interior of the air spring 60 and the other end of which is formed to communicate with the first air passage 41 when the entire length of the cylinder member 51 and the piston member 53 is shortened to a predetermined length (L1). A third air passage 43 is formed in the cylinder member 51, one end of which is formed to communicate with the atmosphere and the other end of which is formed to communicate with the cylinder hole 50. A fourth air passage 44 is formed in the piston member 53, one end of which is formed to communicate with an interior of the air spring 60 and the other end of which is formed to communicate with the third air passage 43 when the entire length of the cylinder member 51 and the piston member 53 is expanded to length (L2). A fifth air passage 55 allows an inner space located adjacent an end of the piston part 40 and within the cylinder hole 50 to communicate with the atmosphere via the third air passage 43.

Length L1 and length L2 may be appropriately selected in consideration of the running condition, the load of a vehicle and the response of the air suspension system of the present invention. An approximately medium length LS between L1 and L2 (in other words, L1<LS<L2) becomes a standard state where the vehicle frame 1 is supported on the vehicle axle (A) under a standard load and running state. Air pressure is formed inside the air spring 60 in order to maintain the aforesaid state.

A standard state illustrated in FIG. 1 is a case where a vehicle is not bumped or rebounded to run in an ideal state. In this state, the first air passage 41 and the second air passage 42 do not communicate, and the third air passage 43 and the fourth air passage 44 are also not mutually interconnected. The compressed air from the air tank cannot be supplied into the air spring, and the inner compressed air inside the air spring 60 cannot be discharged to the atmosphere. As a result, the amount of compressed air inside the air spring 60 remains unchanged to allow the vehicle frame 1 to stably support the vehicle axle (A).

When the space between the vehicle frame 1 and the vehicle axle (A) narrows due to changes in road conditions, running speed and the like, while the vehicle is in movement under the aforementioned state, e.g., when the vehicle is bumped, the air spring 60 shrinks to cause the cylinder member 51 and the piston member 53 to linearly slide and to move to shorten the entire length thereof to gradually change to a state shown in FIG. 2. As a result, the first air passage 41 and the second air passage 42 mutually communicate, while a blockage exists between the third air passage 43 and the fourth air passage 44.

Successively, compressed air is supplied from the air tank into the air spring 60 via the first air passage 41 and the second air passage 42. The compressed air starts to halt the shrinking movement of the air spring 60 to gradually expand the already shrunken air spring 60, leading to generation of power advancing to the original standard state.

When the vehicle rebounds, the air spring 60 expands to prompt the entire length of the cylinder member 51 and the piston member 53 to become gradually elongated to a length up to L2 due to the mutual linear sliding movement thereof. A state as illustrated in FIG. 3 is thereby reached. The compressed air supplied to the first air passage 41 is not transferred to the second air passage 42, preventing the compressed air from being released into the air spring 60. Conversely, the compressed air in the air spring 60 is discharged out into the atmosphere through the third air passage 43 and the fourth air passage 44

As a result, the internal pressure of the air spring 60 decreases to shrink the air spring 60 such that the cylinder member 51 and the piston member 53 linearly slides to a point where the entire length thereof is reduced to return to the standard state as shown in FIG. 1. The states illustrated in FIGS. 1, 2 and 3, are repeated relative to the bumps and rebounds that occur while a vehicle is in movement, automatically maintaining a stable state of the vehicle body.

Figure 4:
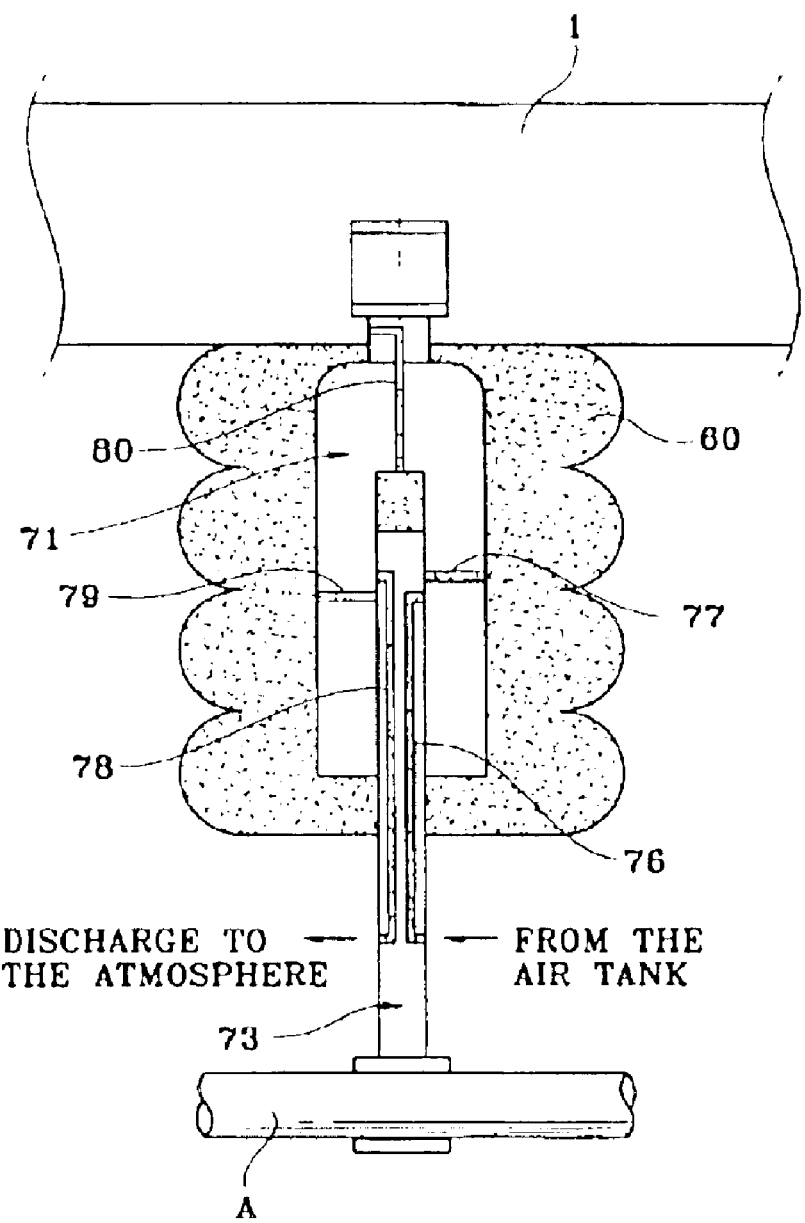
FIGS. 4 and 5 are schematic drawings illustrating another embodiment θ of the present invention.

The technical idea of the present invention can also be applied to a second embodiment, in addition to the first embodiment thus described, where a cylinder member 71 is mounted to a vehicle frame 1 while a piston member 73 is coupled to a vehicle axle (A), as illustrated in FIG. 4. In the second embodiment, the valve means includes a first air passage 76 formed in the piston member 73, one end of which is connected to the air tank for receiving the compressed air and the other end of which is formed for communicating with a cylinder hole. A second air passage 77 is formed in the cylinder member 71, one end of which is connected to an interior of the air spring 60 and the other end of which is formed to communicate with the first air passage 76 when an entire length composed of the cylinder member and the piston member is shortened to length L1. A third air passage 78 is formed in the piston member 71, one end of which is connected to the atmosphere and the other end of which is formed to communicate with the cylinder hole. A fourth air passage 79 is formed in the cylinder member 71, one end of which is connected to an interior of the air spring 60 and the other end of which is formed to communicate with the third air passage 78 when the entire length of the cylinder member and the piston member is expanded to a length L2. A fifth air passage 80 is formed to allow an inner space at an end of the piston member and the cylinder hole to communicate with the atmosphere.

Figure 5:
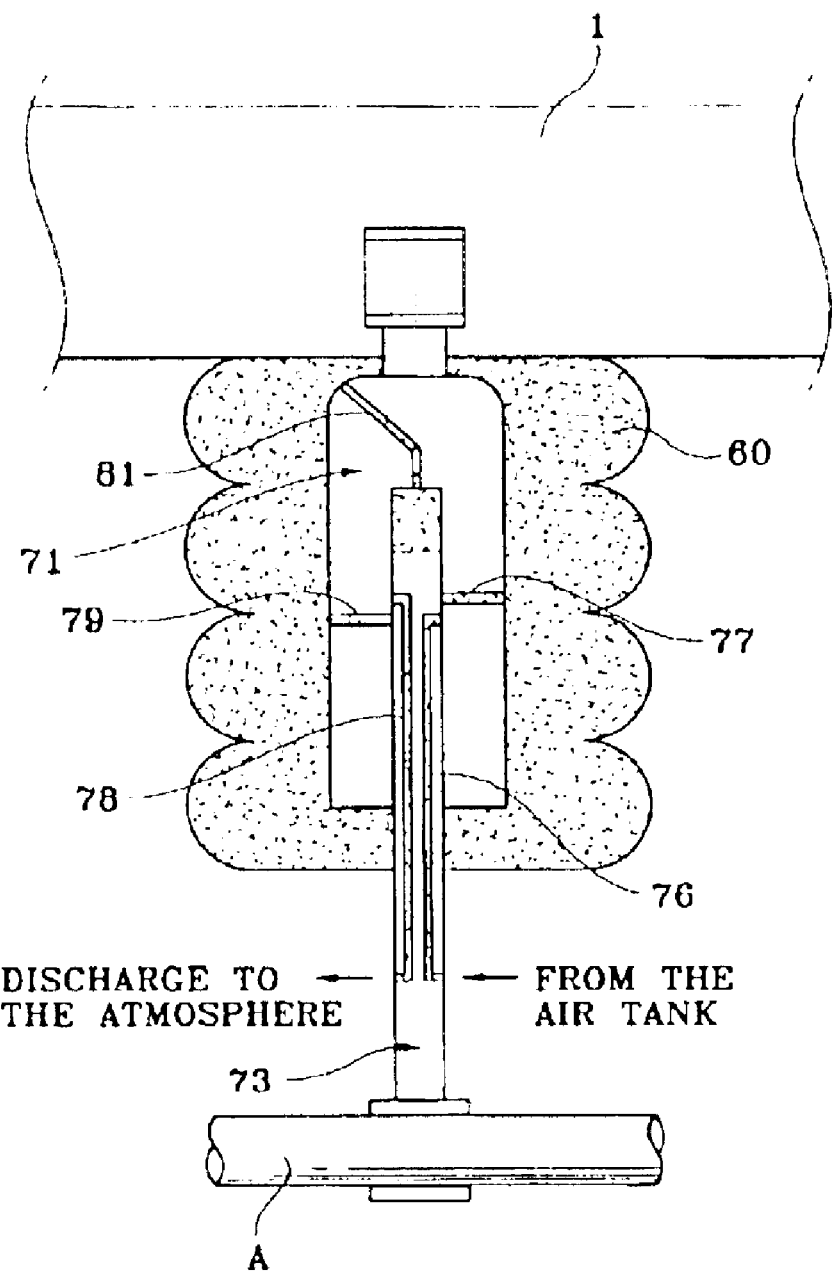

Furthermore, the present invention can be applied to at least a third embodiment as illustrated in FIG. 5. This embodiment is generally similar to the second embodiment, except that fifth air passage 81 is formed to allow a space formed by an end of the piston member and the cylinder hole to communicate with the interior of the air spring. The operational principle is the same as that of the second embodiment.

As apparent from the foregoing, there is an advantage in the air suspension system for a vehicle thus described according to the present invention in that a valve means for varying the resilience of an air spring in response to changes of vehicle height is integrally formed with the air spring to be mounted at a vehicle frame such that the installation space of the air suspension system can be minimized, whereby cumbersome processes involved with the manufacturing of a vehicle can be eliminated to provide an improved convenience for workers.

There is another advantage in that a conventional lever used for connecting a leveling valve and an air spring is dispensed with to reduce the number of parts constituting the air suspension system and lower the manufacturing cost.

The foregoing descriptions of specific embodiments of the present invention are presented for purposes of illustration and description. They are not intended to be exhaustive or to limit the invention to the precise forms disclosed. Obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. An air suspension system of a vehicle, the system comprising:

an air spring connected at an upper end thereof to a lower part of a vehicle frame;

an upper member penetrating the upper end of the air spring and coupled to the vehicle frame;

a lower member penetrating a lower end of said air spring and coupled to the lower end of said air spring and to a vehicle axle, wherein linear sliding movement of the upper and lower members gives rise to changes in an overall length thereof; and valve means in the upper member and lower member for supplying compressed air from an air tank into said air spring in response to the linear sliding movement of said upper and lower members or discharging air inside the air spring out into the atmosphere;

wherein said lower member comprises a cylinder member formed with a cylinder hole having a sectional share along a lengthwise direction, and said upper member comprises a piston member having a piston part with a cross-sectional shape corresponding to that of the cylinder hole; and wherein the valve means comprises:
- a first air passage formed in the cylinder member, one end of which is connected to the air tank for receiving compressed air and the other end of which is connected to said cylinder hole;
- a second air passage formed in the piston member, one end of which is so formed as to communicate with an interior of said air spring and the other end of which is so formed as to communicate with the first air passage when the cylinder member and said piston member are shortened to a first length;
- a third air passage formed in said cylinder member, one end of which is so formed as to communicate with the atmosphere and the other end of which is so formed as to communicate with said cylinder hole;
- a fourth air passage formed in said piston member, one end of which is so formed as to communicate with the interior of said air spring and the other end of which is so formed as to communicate with the third air passage when said cylinder member and said piston member are expanded to a second length; and
- a fifth air passage allowing an inner space adjacent an end of said cylinder hole to communicate with the atmosphere via said third air passage.

2. An air suspension system of a vehicle, the system comprising:

an air spring connected at an upper end thereof to a lower part of a vehicle frame;

an upper member penetrating the upper end of the air spring and coupled to the vehicle frame;

a lower member penetrating a lower end of said air spring and coupled to the lower end of said air spring and to a vehicle axle, wherein linear sliding movement of the upper and lower members gives rise to chances in an overall length thereof; and valve means in the upper member and lower member for supplying compressed air from an air tank into said air spring in response to the linear sliding movement of said upper and lower members or discharging air inside the air spring out into the atmosphere;

wherein said upper member comprises a cylinder member formed with a cylinder hole having a sectional shape along a lengthwise direction, and said lower member comprises a piston member having a piston part with a cross-sectional shape corresponding to that of the cylinder hole; and wherein the valve means comprises:
- a first air passage formed in said piston member, one end of which is connected to said air tank for receiving the compressed air and the other end of which is formed for communicating with said cylinder hole;
- a second air passage formed in said cylinder member, one end of which is connected to the interior of said air spring and the other end of which is formed to communicate with the first air passage when said cylinder member and said piston member are shortened;
- an third air passage formed in said piston member, one end of which is connected to the atmosphere and the other end of which is formed to communicate with said cylinder hole;
- a fourth air passage formed in said cylinder member, one end of which is connected to the interior of said air spring and the other end of which is formed to communicate with the third air passage when said cylinder member and said piston member are expanded; and
- a fifth air passage allowing an inner space adjacent an end of said cylinder hole to communicate with the atmosphere.

3. An air suspension system of a vehicle, the system comprising:

an air spring connected at an upper end thereof to a lower part of a vehicle frame:

an upper member penetrating the upper end of the air spring and coupled to the vehicle frame;

a lower member penetrating a lower end of said air spring and coupled to the lower end of said air spring and to a vehicle axle, wherein linear sliding movement of the upper and lower members gives rise to changes in an overall length thereof; and valve means in the upper member and lower member for supplying compressed air from an air tank into said air spring in response to the linear sliding movement of said upper and lower members or discharging air inside the air spring out into the atmosphere;

wherein said upper member comprises a cylinder member formed with a cylinder hole having a sectional shape along a lengthwise direction, and said lower member comprises a piston member having a piston part with a cross-sectional shape corresponding to that of the cylinder hole; and wherein the valve means comprises:
- a first air passage formed in said piston member, one end of which is connected to said air tank for receiving said compressed air and the other end of which is formed for communicating with said cylinder hole;
- a second air passage formed in said cylinder member, one end of which is connected to the interior of said air spring and the other end of which is formed to communicate with the first passage when said cylinder member and said piston member are shortened;
- an third air passage formed in said piston member, one end of which is connected to the atmosphere and the other end of which is formed to communicate with said cylinder, hole;
- a fourth air passage formed in said cylinder member, one end of which is connected to the interior of said air spring and the other end of which is formed to communicate with, the third air passage when said cylinder member and said piston member are expanded; and
- an fifth air passage allowing an inner space adjacent an end of said cylinder hole to communicate with the interior of said air spring.

* * * * *